United States Patent [19]

de Koe

[11] 3,727,204

[45] Apr. 10, 1973

[54] ASYNCHRONOUS BUFFER DEVICE

[75] Inventor: Oscar Bernardus Philomenus Rikkert de Koe, Emmasingel, Eindhoven, Netherlands

[73] Assignee: U.S. Philips Corporation, New York, N.Y.

[22] Filed: Apr. 21, 1972

[21] Appl. No.: 246,150

[30] Foreign Application Priority Data

Apr. 23, 1971 Netherlands ........................7105512

[52] U.S. Cl. ................................340/172.5, 307/221

[51] Int. Cl. ............................................H03k 21/16

[58] Field of Search ..................................340/172.5; 307/221 R

[56] References Cited

UNITED STATES PATENTS

| | | | |
|---|---|---|---|
| 3,051,929 | 8/1962 | Smith | 340/172.5 |
| 2,997,704 | 8/1961 | Gordon et al. | 340/172.5 |
| 3,209,330 | 9/1965 | Bonomo | 340/172.5 |
| 3,214,573 | 10/1965 | Anderson et al. | 340/172.5 |

*Primary Examiner*—Gareth D. Shaw
*Attorney*—Frank R. Trifari

[57] ABSTRACT

An asynchronous buffer device comprising an information shift register and a bookkeeping register, the shift rate of the information stored in the shift register and the shift rate of the control signals which control the information flow in the shift register and which are stored in the bookkeeping register being adapted to each other in that the information register and the bookkeeping register are composed of set-reset elements which are associated with each other in a one-to-one relationship, and which each comprise two inputs and two outputs, the two outputs of each set-reset element in the shift register being interconnected to the two inputs of the next set-reset element, only one output which is the same for all set-reset elements being interconnected in the bookkeeping register to an input which is the same for all set-reset elements.

2 Claims, 4 Drawing Figures

ASYNCHRONOUS BUFFER DEVICE

The invention relates to an asynchronous buffer device comprising an information shift register having $n$ sections, an information input and an information output, each section being provided with a control terminal for receiving shift pulses, comprising a bookkeeping register having $n$ first set-reset elements which are associated with the sections of the shift register in a one-to-one relationship, each element being provided with a set input, a signal output, a reset input and an inverted signal output, comprising a first supply terminal for receiving the clock pulses of the information to be written in, said supply terminal being connected to the set input of the first element, the bookkeeping register comprising n-1 coupling circuits which are associated with the first n-1 set-reset elements in a one-to-one relationship, each of said coupling circuits comprising a first input, a second input and an output, the first input of each coupling circuit being coupled to the information output of the set-reset element with which it is associated, the second input of each coupling circuit being connected, via a blocking conductor, to an output of the next set-reset element, the output of each coupling circuit being connected to the control terminal of the section of the shift register with which it is associated, to the set input of the next set-reset element and to the reset input of the set-reset element with which it is associated, and comprising a second supply terminal for receiving the clock pulses of the information to be supplied, said supply terminal being coupled to the control terminal of the $n^{th}$ section and to the reset input of the $n^{th}$ set-reset element.

Buffer devices of this kind are used for coupling digital telephone and date transmission systems. These transmission systems utilize clock frequencies which are equal to each other on the average but which may be unequal at any given instant due to the occurrence of changes in phases, for example, as a result of delay time variations in the transmission systems.

Due to the fact that the shifting of the information in the information register in systems of this kind is controlled by signals which are registered in the bookkeeping register, the maximum shift rate of these signals may not be higher than the shift rate of the information in the information register.

British Pat. Specification 917,853 describes an asynchronous buffer device in which each coupling circuit of the bookkeeping register is provided with a delay element so as to satisfy this requirement. Consequently, this asynchronous buffer device is less suitable for realization in an integrated form.

The invention has for its object to realize an asynchronous buffer device, the structure of which has a substantially repetitious character so that the buffer device can substantially be composed of one kind of logic structural element. The invention also has for its object to provide an asynchronous buffer device in which the shift rate of the signals in the bookkeeping register is adapted, by way of a safe design, to that of the information register so that a buffer device offering substantial operating reliability is obtained.

The device according to the invention is characterized in that each coupling circuit is formed by a second set-reset element, the set input thereof forming the first input, the reset input forming the second input, and the signal output forming the output of the coupling circuit, a second set-reset element being associated with the $n^{th}$ section, the set input thereof being connected to the signal output of the first set-reset element associated with this section, the signal output being connected on the one side to the control terminal of the section with which it is associated and on the other side to the reset input of the first set-reset element associated with this section, the reset input being connected to the second supply terminal, each section of the shift register comprising two third and fourth set-reset elements provided with control inputs, the outputs of each third set-reset element being connected to the inputs of the fourth set-reset element of the same section, the outputs of each fourth set-reset element of the first n-1 sections being connected to the inputs of the third set-reset element of the next section, the reset input of the third set-reset element of the shift register being connected to an inverted information input, the control input of the third set-reset element of each section being connected to the signal output of the first set-reset element associated with the section, the control input of the fourth set-reset element of each section being connected to the control terminal of the section.

The invention and its advantages will be described in detail with reference to the figures, corresponding parts in the various figures being denoted by the same references.

Figure 1:
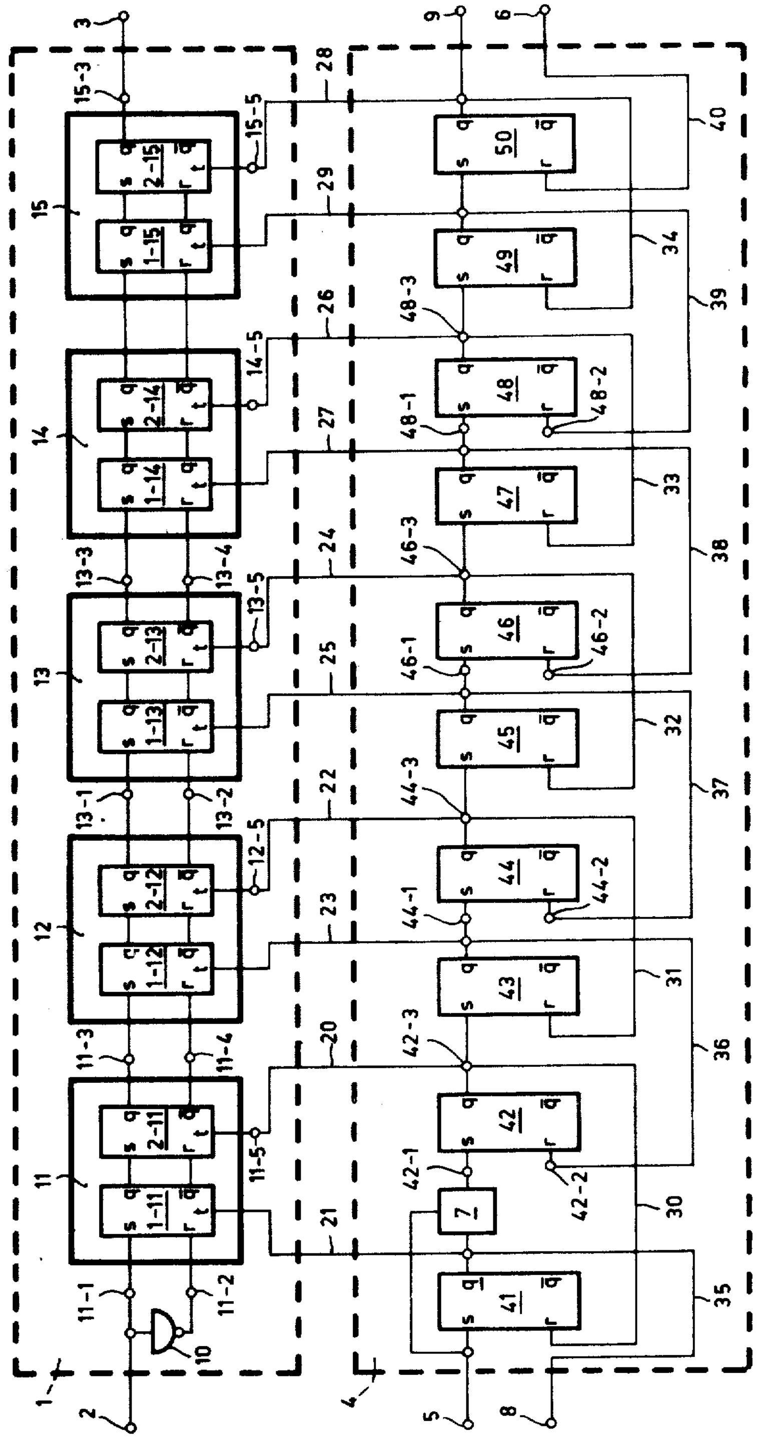
FIG. 1 shows an embodiment of an asynchronous buffer device according to the invention.

The asynchronous buffer device shown in FIG. 1 comprises an information shift register 1 and a bookkeeping register 4. The information shift register 1 is provided with an information input 2 to which digital information originating, for example, from a first transmission system, is supplied and also with an information output 3, the information of which is taken off by a second transmission system. Both transmission systems, not shown in the figure, have the same clock pulse repetition frequencies on the average, it being possible for said frequencies to be different at any given instant. In order to compensate for these instantaneously occurring frequency differences, the information is temporarily stored in the shift register 1. The shift register 1 comprises, by way of example, five cascade-connection sections 11, 12, 13, 14 and 15. A first input 11-1 of the first section 11 is connected to the information input 2, and an output 15-3 of the last section 15 is connected to the information output 3, so that the information applied to the information input 2 successively traverses the sections 11 to 15, and is supplied to the information output 3. So as to control the information transport in the shift register 1, each of the sections 11 to 15 is provided with a control terminal 11-5 to 15-5 to which the shift pulses originating from the bookkeeping register 4 are applied. This bookkeeping register 4 is provided with first set-reset elements 41, 43, 45, 47 and 49, each of which is associated with the sections 11 to 15 of the information shift register 1 in a one-to-one relationship. These set-reset elements comprise a set input *s*, a signal output *q*, a reset input *r* and an inverted signal output $\overline{q}$. Depending on the construction of the set-reset elements, they will be set or reset by a leading or trailing edge applied to the set input or the reset input, respectively, of these set-reset elements. Unless explicity otherwise stated, it will be assumed hereinafter that these set-reset elements are responsive to leading edges, the contents of each set-reset element being characterized in the set state by a high output voltage of the signal output *q*, the reset state being characterized by a low output voltage of the signal output *q*. These set-reset elements are connected to each other by means of coupling circuits 42, 44, 46 and 48. The bookkeeping register furthermore comprises a first supply terminal 5 to which the clock pulses of the first transmission system are applied, and a second supply terminal 6 to which the clock pulses of the second transmission system are applied.

The operation is as follows: the starting situation is assumed to be the situation in which all set-reset elements 41, 43, 45, 47 and 49 are in the reset state. The leading edge of a clock pulse applied to the first supply terminal 5 will set this element via the set input of the set-reset element 41 which is connected to this terminal 5. The information applied to the information input 2 during the appearance of the clock pulse will be stored in the section 11 via the input 11-1. The positive voltage variation of the set-reset element 41 occurring the signal output *q* when this element is set by the clock pulse, is applied to the output 42-3 of coupling circuit 42 via the coupling circuit 42, a first input 42-1 of which is connected to the signal output *q* of set-reset element 41. This positive voltage variation is applied, on the one side, via a control conductor 20, to the control terminal 11-5 of section 11, which in reaction thereto supplies the information stored in this section 11 to the outputs 11-3 and 11-4 of this section. On the other side, the positive voltage variation of the output 42-3 of coupling circuit 42 is applied to the set input s of set-reset element 43. As a result, the set-reset element 43 is set, whilst at the same time the information appearing on the outputs 11-3 and 11-4 of section 11 is written into section 12 of the information register 1. The positive voltage variation on the output 42-3 is furthermore applied, via a return conductor 30, to the reset input of set-reset element 41 so that this element is reset. The information stored in section 12 when the set-reset element 43 is in the set state, is identical to the information stored in section 11 when the set-reset element 41 was in the set state. The information in the information register and the set states of the set-reset elements occurring in the bookkeeping register 4 have been shifted over one section of the information shift register 1 in the buffer device. The information is shifted to the next section etc. in an identical manner. This is repeated until the information is stored in section 15 and set-reset element 49 has been set.

The coupling circuits 42, 44, 46 and 48 are provided with a second input 42-2, 44-2, 46-2 and 48-2, said input inhibiting or nor inhibiting, depending on the value of the voltage signal applied thereto, a positive voltage variation, applied to the first input 42-1, 44-1, 46-1 or 48-1, from causing a positive voltage variation on the output 42-3, 44-3, 46-3, 48-3, respectively.

The second supply terminal 6 is connected to the reset input *r* of set-reset element 49. As long as no clock pulse is applied to this terminal 6, the set-reset element 49 will not be reset. Furthermore, the second supply terminal 6 is coupled to the control terminal 15-5 so that as long as this supply terminal 6 receives no clock pulse, no shift pulse will be applied to control terminal 15-5 of section 15 so that the information remains stored in section 15. In this situation the voltage of the signal output of set-reset element 49 is high. This high voltage is applied, via blocking conductor 39, to the second input 48-2 of coupling circuit 48 so that coupling circuit 48 is blocked.

Information applied to input terminal 2 during the time that a subsequent clock pulse is being applied to supply terminal 5, is written into section 11 of the information register again. This information is shifted to section 12 in the described manner etc. This information, however, can not be shifted further than section 14 as coupling circuit 48 is blocked. As set forth, the set-reset element 47 is in the set state during the writing of information into section 14, and blocks the coupling circuit 46 via blocking conductor 38 and the second input 46-2 of this coupling circuit 46. It is thus achieved that as long as there is information in a section of the information register, it cannot be erased by new information applied to the buffer device. The information which is applied to information input 2 during the appearance of a first clock pulse on supply terminal 5, is stored in section 15 of the information register 1 as described, the information supplied during the appearance of the second clock pulse being stored in section 14, etc.

For reading information out of the buffer device, a clock pulse is applied to the second supply terminal 6. This clock pulse causes, on the one hand, a shift pulse to be applied to control terminal 15-5 of section 15 so that the information stored in section 15 can be taken off from information output 3, and the resetting of set-reset element 49 on the other hand. The voltage on the signal outputs *q* is then low. This low output voltage is applied, via blocking conductor 39, to the input terminal 48-2 of the coupling circuit 48 so that this coupling circuit 48 is unblocked. The information stored in section 14 is then transported to the section 15 in the described manner, etc.

In the buffer device described in British Pat. Specification 917,853, each of the coupling circuits 42, 44, 46 and 48 comprises an "AND"-gate, a first input of which is connected to the input 42-1, 44-1, 46-1, 48-1, respectively, a second input being connected to the input 42-2, 44-2, 46-2, 48-2, respectively, the output of the "AND"-gate being connected to the output 42-3, 44-3, 46-3, 48-3, respectively. Furthermore, the second input is connected, via the blocking conductor 36, 37, 38, 39, to the inverted output $\overline{q}$ of the set-reset element 43, 45, 47, 49, respectively.

The rate at which a set state of a set-reset element 41, 43, 45, 47 is shifted further to a subsequent set-reset element 43, 45, 47, 49 depends on the setting inertia of the set-reset element and on the switching inertia of the "AND"-gate of the intermediate coupling circuit. If these inertiae are small, a set state of the set-reset elements can be very quickly shifted through the bookkeeping register 4.

The rate at which the information of a section 11, 12, 13 or 14 is shifted to the next section 12, 13, 14 or 15 of the shift register, is dependent of the construction of the section. If the information shift rate in the shift register 1 is smaller than the shift rate of a set state of the set-reset elements in the bookkeeping register, a given set-reset element will be set without the desired information being applied to the inputs of the section of the shift register 1 which is associated with this element. This set-reset element will then block the preceding coupling circuit, so that the supply of information to the said section of the shift register is stopped. In that case this section does not contain the desired information so that erroneous information is added to the information to be buffered in the buffer device. So as to prevent this, each coupling circuit of the known buffer device comprises a delay element which is connected between the output of the "AND"-gate and the output of the coupling circuit, said delay element having an adequately large delay time. This has the drawback that it is then very difficult to realize the buffer device in an integrated form. So as to realize a readily integratable buffer device in which the shift rate of the set states of the set-reset elements of the bookkeeping register 4 is adapted to the shift rate of the information in the shift register 1, according to the invention each coupling circuit 42, 44, 46, 48 is formed by a second set-reset element, the set input *s* of which constitutes the first input 42-1, 44-1, 46-1, 48-1, respectively, the reset input *r* thereof constituting the second input 42-2, 44-2, 46-2, 48-2, respectively, and the signal output *q* thereof constituting the output 42-3, 44-3, 46-3, 48-3 of the coupling circuit 42, 44, 46, 48, respectively. Associated with the section 15 is a second set-reset element 50, the set input *s* of which is connected to the signal output *q* of the first set-reset element 49 associated with this section 15, the signal output *q* of the said set-reset element 49 being connected on the one side to the control terminal 15-5 of the section with which it is associated, and on the other side to the reset input *r* of the first set-reset element 49 associated with this section 15, the reset input thereof being connected to the second supply terminal. Each section 11, 12, 13, 14, 15 of the shift register 1 furthermore comprises third and fourth set-reset elements provided with control inputs *t*, the outputs *q* and $\bar{q}$ of each third set-reset element 1-11, 1-12, 1-13, 1-14, 1-15 being connected to the inputs *s* and *r* of the fourth set-reset element 2-11, 2-12, 2-13, 2-14, 2-15, respectively, the outputs *q* and *q* of each fourth set-reset element 2-11, 2-12, 2-13, 2-14, 2-15 of the first four sections 11, 12, 13, 14 being connected to the inputs *s* and *r* of the third set-reset element 1-12, 1-13, 1-14, 1-15, respectively, of the next section 12, 13, 14, 15, respectively. The reset input *r* of the third set-reset element 1-11 is connected to an inverted information input, formed by the output of an inverter amplifier 10, the input of which is connected to the information supply terminal 2. The control input *t* of the third set-reset element 1-11, 1-12, 1-13, 1-14, 1-15 of each section 11, 12, 13, 14, 15, respectively, is connected to the signal output *q* of the first set-reset element 41, 43, 45, 47, 49 associated with the section 11, 12, 13, 14, 15, respectively, the control input *t* of the fourth set-reset element 2-11, 2-12, 2-13, 2-14, 2-15 of each section 11, 12, 13, 14, 15, respectively, being connected to the control terminal 11-5, 12-5, 13-5, 14-5, 15-5, respectively, of that section.

As is shown in FIG. 1, a buffer device is realized which has a substantially repetitious character and which is composed mainly of one kind of logical structural element, i.e. the set-reset element.

In this respect it is to be noted that the set-reset elements 41 to 50 used in the bookkeeping register 4 may be identical to the set-reset elements 1-11, 2-11 to 2-15 used in the shift register 1, in which case the control input *t* can be connected to a voltage source of constant potential. Consequently, this embodiment of the buffer device according to the invention is very suitable for realization in an integrated form.

Figure 2:
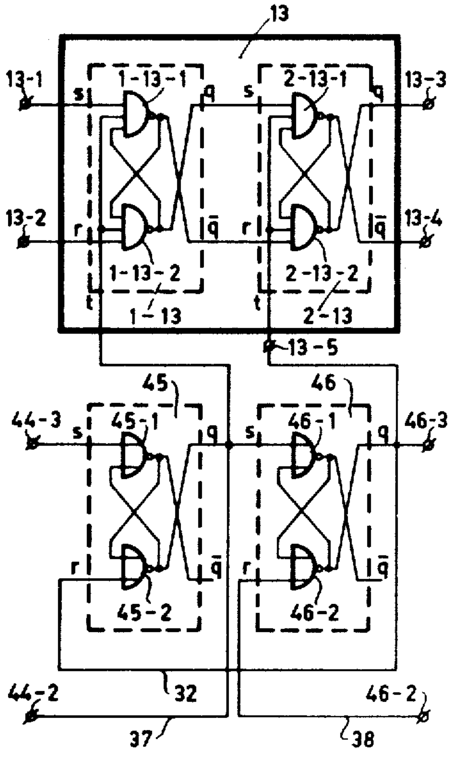
FIG. 2 shows an embodiment of a section of an information shift register and the set-reset elements of the asynchronous buffer device according to the invention associated therewith.

For further illustration of the invention, FIG. 2 shows, by way of example, section 13 of the shift register 1 with the associated first and second set-reset elements 45 and 46 of the bookkeeping register 4. The first and the second set-reset element, used in the bookkeeping register 4 are composed, for example, of two "-NAND"-gates 45-1, 45-2 and 46-1, 46-2, respectively, in known manner, the third and the fourth set-reset element used in the shift register 1 being composed, for example, of two "NAND"-gates 1-13-1, 1-13-2 and 2-13-1, 2-13-2, respectively, in known manner.

A positive voltage variation occurring on the signal output 44-3 is applied, via set input *s*, to an input of the "NAND"-gate 45-1 so that the latter applies a negative voltage variation to a first input of the "NAND"-gate 45-2. If a low signal voltage is applied, via return conductor 32, to the other input of the "NAND"-gate 45-2, the negative voltage variation on the first input of "-NAND"-gate 45-2 causes a positive voltage variation on the output of this "NAND"-gate, said voltage variation being applied to the information output q of this set-reset element 45. It follows that the "NAND"-gates 45-1 and 45-2 are to be successively switched over for transferring the voltage variation from output 44-3 to the information output *q* of set-reset element 45, which requires twice the time which is required for switching one gate.

The information in the shift register 1 is applied to the set input *s* via the input 13-1, and the inverted information is applied, via the input 13-2 of section 13, to the reset input *r* of the third set-reset element 1-13. At the same time, a low voltage is applied to the control input *t*. As a result, the voltage on the outputs of noth "NAND"-gates 1-13-1 and 1-13-2 is high. If the voltage on the control input t changes from low to high, high voltages are applied to all inputs of one of the "-NAND"-gates 1-13-1, 2-13-1, because either the information voltage or the inverted information voltage is high. This "NAND"-gate changes the voltage on the output thereof from high to low, so that set-reset element 1-13 is again in a stable state. The transferring of the information present on the inputs to the outputs of this set-reset element 1-13 requires only the switching time of one gate circuit. As a result, the rate at which the information is shifted in the shift register 1 is theoretically twice as high as the rate at which a set state is shifted through the bookkeeping register 4, so that no incorrect information can be introduced during shifting. In practice, the set-reset elements have a manufacturing tolerance. However, it was found that these tolerances are smaller than the tolerances permitted by the construction of the buffer device.

So as to avoid the necessity of the use of a special clock signal or the necessity that, during the presence of a clock pulse on supply terminal 5, the information applied to the information input 2 has to be written in a number of times in succession, the information output *q* of the first set-reset element 41 is connected, via a blocking circuit 7 (FIG. 1), to the set input *s* of the second set-reset element 42.

Figure 3:
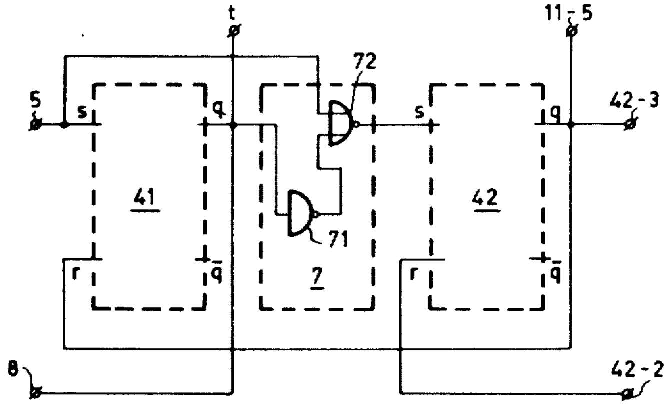
FIG. 3 shows a portion of the bookkeeping register of the asynchronous buffer device according to the invention.

Blocking circuit 7 comprises an inverter amplifier 71 and a "NAND"-gate 72 (FIG. 3). A clock pulse applied to supply terminal 5 sets the first set-reset element 41. The high voltage appearing on the information output *q* of set-reset element 41 is applied, on the one side, to the control input *t* of the third set-reset element 1-13 so that information is written in this element 1-13. On the other side, the high voltage is applied to inverter amplifier 71, which then applies a low voltage to a first input of the "NOR"-gate 72, the other input of which directly receives the high voltage of the clock pulse.

The output voltage of this "NOR"-gate 72 is then low so that the second set-reset element 42 is not set. In reaction to the trailing edge of the clock pulse, the voltage applied to the other input of the "NOR"-gate 72 becomes low and "NOR"-gate 72 supplies a high output voltage so that the second set-reset element 42 is set. This element applies a positive voltage variation to control terminal 13-5 via the signal output *q*, so that the information stored in set-reset element 1-13 is transferred to set-reset element 2-13. It is thus achieved that information can be readily written in the shift register 1 only once per clock pulse.

The clock pulses applied to supply terminal 6 are not subject to special requirements either. As long as a high voltage is applied to this supply terminal 6 by a clock pulse (FIG. 1), the set-reset element 50 cannot be set again by a voltage applied to the set input *s* because the voltage on the reset input *r* is high. When the trailing edge of the clock pulse applied to supply terminal 6 appears, the voltage applied to the reset input *r* becomes low and set-reset element 50 can be written in again. It is thus achieved that for each clock pulse applied to the supply terminal 6 information can be read from the shift register only once.

In the portion of the asynchronous buffer device shown in FIG. 1 which is shown in detail, by way of example, in FIG. 2, it is assumed that, if a high output voltage is applied by a set-reset element, for example, element 45 to the control input *t* of a set-reset element (1-13) of the shift register, the information applied to the input terminals of the set-reset element (1-13) is written into this set-reset element. As a result, the information stored in a set-reset element of the shift register 1 necessitates that the set-reset element of the bookkeeping register 4 associated therewith is set.

The bookkeeping register according to the invention, however, can be constructed such that information stored in a set-reset element of the information register 1 necessitates that the set-reset element of the bookkeeping register 4 associated therewith is reset. To this end, the set-reset elements of the bookkeeping register 4 and of the information register 1 must both contain one kind of gate.

Figure 4:
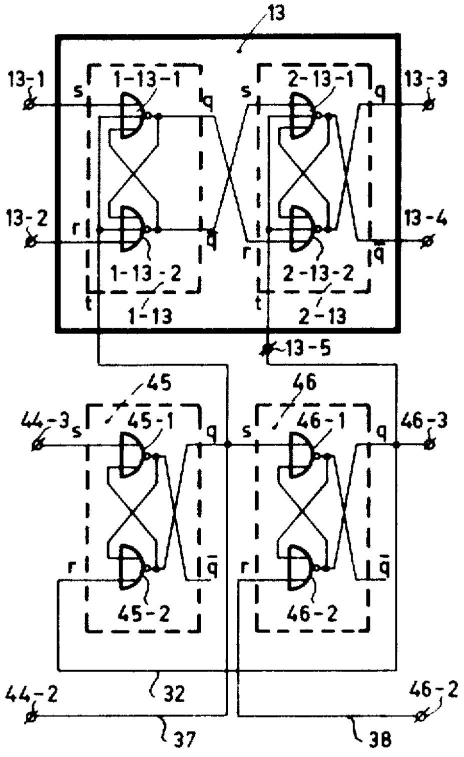
FIG. 4 shows another embodiment of a section of the information register and the set-reset elements of the asynchronous buffer device according to the invention associated therewith.

FIG. 4 shows the same portion of the buffer device as is shown in FIG. 2, but all set-reset elements are composed of two "NOR"-gates in known manner. For example, if set-reset element 45 is set in FIG. 4, this element applies a high output voltage, via the control input *t* of element 1-13, to an input of each of the "-NOR"-gates 1-13-1 and 1-13-2. As a result, the output voltage of these two "NOR"-gates becomes low. The information applied to the inputs 13-1 and 13-2 cannot be written into element 1-13. If set-reset element 45 returns to the reset state as a result of a high voltage applied, via conductor 32, to reset input *r* of the set-reset element, a low output voltage is applied to control input *t* of set-reset element 1-13. Low voltages are applied to all inputs of one of the "NOR"-gates 1-13-1 and 1-13-2, so that this "NOR"-gate supplies a high voltage. As a result, the information applied to the inputs of this set-reset element 1-13 is written into this set-reset element. Information written in the shift register is then characterized in the bookkeeping register by a non-set bistable element. This is possible in the buffer device according to the invention because each of the set-reset elements 42 to 50 in the bookkeeping register 4 resets via the connection established between the signal output *q* of this set-reset element and the reset input *r* of the preceding set-reset element 41 to 49, this preceding set-reset element and keeps it reset if the set-reset element 42 to 50 itself is set. If information is only written in the buffer device and no information is read, the set-reset elements 41 to 50 will be alternately set and reset if a stable state is reached in the bookkeeping register 4. It is thus possible to indicate in the bookkeeping register 4 that a set-reset element of the shift register 1 contains information by utilizing the fact that the set-reset element associated with the set-reset element of the shift register, as realized by the construction of a buffer device with set-reset element as shown in FIG. 2, is in the set state, or by utilizing the fact that the set-reset element which is associated with the set-reset element of the shift register, as realized by the construction of a buffer device with bistable elements as shown in FIG. 4, is in the reset state.

It is to be noted that the buffer device may also be composed of the set-reset elements shown in FIG. 2 and FIG. 4, the "NOR"-gates then being replaced by "-NAND"-gates, and vice versa. All signals occurring in the buffer device are then the inverted values of the signals occurring in the buffer device when the latter is composed of the gates shown in FIGS. 2 and 4.

The capacity of the buffer device is determined by the number of sections of the information register.

The signal output *q* of set-reset element 41 is connected to an input terminal 8 and the signal output *q* of set-reset element 50 is connected to an output terminal 9 so as to obtain a buffer device having a larger capacity by series connection of two of such buffer devices. To this end, the terminals 3, 9 and 6 of a first buffer device must be connected to the terminals 2, 5 and 8 of a second buffer device, and the input of the blocking circuit 7 of the second buffer device must be connected to the output of this blocking circuit 7.

What is claimed is:

1. An asynchronous buffer device comprising an information shift register having $n$ sections, an information input and an information output, each section being provided with a control terminal for receiving shift pulses, comprising a bookkeeping register having $n$ first set-reset elements which are associated with the sections of the shift register in a one-to-one relationship, each element being provided with a set input, a signal output, a reset input and an inverted signal output, comprising a first supply terminal for receiving the clock pulses of the information to be written in, said supply terminal being connected to the set input of the first element, the bookkeeping register comprising n-1 coupling circuits which are associated with the first n-1 set-reset elements in a one-to-one relationship, each of said coupling circuits comprising a first input, a second input and an output, the first input of each coupling circuit being coupled to the information output of the set-reset element with which it is associated, the second input of each coupling circuit being connected, via a blocking conductor, to an output of the next set-reset element, the output of each coupling circuit being connected to the control terminal of the section of the shift register with which it is associated, to the set input of the next set-reset element and to the reset input of the set-reset element with which it is associated, and comprising a second supply terminal for receiving the clock pulses of the information to be supplied, said supply terminal being coupled to the control terminal of the $n^{th}$ section and to the reset input of the $n^{th}$ set-reset element, characterized in that each coupling circuit is formed by a second set-reset element, the set input thereof forming the first input, the reset input forming the second input, and the signal output forming the output of the coupling circuit, a second set-reset element being associated with $n^{th}$ section, the set input thereof being connected to the signal output of the first set-reset element associated with this section, the signal output being connected on the one side to the control terminal of the section with which it is associated and on the other side to the reset input of the first set-reset element associated with this section, the reset input being connected to the second supply terminal, each section of the shift register comprising two third and fourth set-reset elements provided with control inputs, the outputs of each third set-reset element being connected to the inputs of the fourth set-reset element of the same section, the outputs of each fourth set-reset element of the first n-1 sections being connected to the inputs of the third set-reset element of the next section, the reset input of the third set-reset element of the shift register being connected to an inverted information input, the control input of the third set-reset element of each section being connected to the signal output of the first set-reset element associated with the section, the control input of the fourth set-reset element of each section being connected to the control terminal of the section.

2. An asynchronous buffer device as claimed in claim 1, characterized in that the information input of the first set-reset element which is associated with the first section of the shift register is connected to an input of an inverting gate circuit via an inverter, another input thereof being connected to the first supply terminal, the output thereof being connected to the set input of the second set-reset element associated with the first section.

* * * * *